United States Patent
Dinu et al.

(10) Patent No.: US 7,093,438 B2
(45) Date of Patent: Aug. 22, 2006

(54) MULTIPLE VENTURE TUBE GAS FUEL INJECTOR FOR A COMBUSTOR

(75) Inventors: Constantin Dinu, Greer, SC (US); Thomas Raymond Farrell, Simpsonville, SC (US); Kevin M. Gordon, Greer, SC (US); James Michael Storey, Taylors, SC (US); Krishna Kumar Venkataraman, Simpsonville, SC (US)

(73) Assignee: General Electric Company, Schenectady, NY (US)

( * ) Notice: Subject to any disclaimer, the term of this patent is extended or adjusted under 35 U.S.C. 154(b) by 122 days.

(21) Appl. No.: 10/905,686

(22) Filed: Jan. 17, 2005

(65) Prior Publication Data

US 2006/0156730 A1   Jul. 20, 2006

(51) Int. Cl.
*F02C 1/00* (2006.01)
*F02G 3/00* (2006.01)

(52) U.S. Cl. .................. 60/737; 60/723; 60/39.822

(58) Field of Classification Search .............. 60/737, 60/723, 740, 742, 747, 39.822
See application file for complete search history.

(56) References Cited

U.S. PATENT DOCUMENTS

| | | | | |
|---|---|---|---|---|
| 3,143,401 A | * | 8/1964 | Lambrecht | 48/180.1 |
| 3,643,431 A | * | 2/1972 | Jamieson | 60/738 |
| 4,047,877 A | | 9/1977 | Flanagan | 431/8 |
| 4,226,087 A | * | 10/1980 | Spadaccini | 60/749 |
| 4,356,698 A | * | 11/1982 | Chamberlain | 60/733 |
| 4,534,165 A | | 8/1985 | Davis, Jr. et al. | 60/39.02 |
| 4,845,952 A | | 7/1989 | Beebe | 60/737 |
| 4,966,001 A | | 10/1990 | Beebe | 60/737 |
| 5,161,366 A | * | 11/1992 | Beebe | 60/777 |
| 5,826,429 A | * | 10/1998 | Beebe et al. | 60/723 |
| 5,850,731 A | * | 12/1998 | Beebe et al. | 60/778 |
| 5,924,276 A | * | 7/1999 | Mowill | 60/39.23 |
| 6,220,034 B1 | * | 4/2001 | Mowill | 60/737 |
| 6,250,066 B1 | * | 6/2001 | Lawrence et al. | 60/39.23 |
| 6,442,939 B1 | * | 9/2002 | Stuttaford et al. | 60/737 |
| 6,460,345 B1 | * | 10/2002 | Beebe et al. | 60/777 |
| 6,886,341 B1 | * | 5/2005 | Inoue et al. | 60/737 |

* cited by examiner

*Primary Examiner*—William H. Rodriguez
(74) *Attorney, Agent, or Firm*—Cantor Colburn LLP

(57) ABSTRACT

A gas fuel injector includes a first header plate; a second header plate spaced downstream from the upstream header plate; and a plurality of venturi tubes arranged in rows and sealably secured to the first and second header plates. Each of the venturi tubes includes an inlet section, a throat section and an exit. The exit is shaped into a pattern that reduces space between each of the venturi tubes at the exit of each of the plurality of venturi tubes.

23 Claims, 6 Drawing Sheets

MULTIPLE VENTURE TUBE GAS FUEL INJECTOR FOR A COMBUSTOR

BACKGROUND OF THE INVENTION

The present invention relates to a gas fuel injector for a combustor in an engine.

A present thrust of gas-turbine engine technology seeks to attain reduced emissions of nitrogen-oxygen and unburned hydrocarbon compounds (NOx and UHC, respectively). Prior-art techniques for accomplishing such reduced emissions almost invariably result in reduced thermodynamic efficiency or substantially increased capital costs.

NOx compounds are produced by reaction of the nitrogen in the air at elevated temperatures conventionally found in the combustors of a gas turbine engine. NOx formation can be reduced by reducing the maximum flame temperature in the combustor. Injection of steam into the combustor reduces the maximum flame temperature in the combustor at the cost of thermodynamic efficiency. Penalties must also be paid in water use, and water treatment capital and operating costs. The amount of steam injection, and its attendant costs, rises with the amount of NOx reduction desired. Some states and foreign countries have announced targets for NOx reduction that infer such large quantities of steam that this solution appears less desirable for future systems.

NOx compounds can be removed from the exhaust downstream of a gas turbine engine by mixing a reagent such as, for example, ammonia, with the exhaust stream and passing the resulting mixture through a catalyst before venting to the atmosphere. The catalyst encourages the reaction of the NOx compounds with the reagent to produce harmless components. This technique, although successful in reducing NOx compounds to target levels, requires substantial additional capital outlay for the catalyst bed, a larger exhaust system to provide room for the large catalyst bed and spray bars to deliver the reagent into the exhaust stream. The on-going cost of large quantities of the reagent must also be borne.

The maximum flame temperature can be reduced without steam injection using catalytically supported combustion techniques. A fuel-air mixture is passed through a porous catalyst within the combustor. The catalyst permits complete combustion to take place at temperatures low enough to avoid NOx formation. Several U.S. patents such as, for example, U.S. Pat. Nos. 4,534,165 and 4,047,877, illustrate combustors having catalytically supported combustion.

Reduction or elimination of hydrocarbon emissions is attainable by ensuring complete combustion of the fuel in the combustor. Complete combustion requires a lean fuel-air mixture. As the fuel-air mixture is made leaner, a point is reached at which combustion can no longer be supported. The presence of a catalyst also permits combustion of leaner fuel-air mixtures than is possible without the catalyst. In this way, catalytically supported combustion aids in reducing both types of environmental pollution.

One problem, not completely solved by the referenced prior-art patents, is attaining a uniform flow field of fuel-air mixture across the entire face of a catalyst bed. That is, the fuel-air mixture and the gas velocity vary across the face of the catalyst bed, resulting in uneven combustion across the catalyst. This reduces combustor efficiency and can permit unburned hydrocarbons to escape to the exhaust.

In the referenced U.S. Pat. No. 4,047,877 patent, for example, liquid fuel and air are injected into a chamber upstream of the catalyst bed. The fuel-air mixture then flows through the catalyst bed, wherein the fuel and air react. As pointed out in this patent, unburned fuel may exit the catalyst. A gas-fuel burner downstream of the catalyst is relied on to burn this unburned liquid fuel.

The U.S. Pat. No. 4,534,165 patent breaks up the catalytic bed into concentric zones, each having its own liquid fuel and air supply. Although the patent proposes that the advantage of breaking the catalytic bed and fuel-air supply into zones is found in the resulting ability to stage fuel to the individual zones, it might be presumed that the resulting smaller area of catalytic bed fed by each fuel-air supply device may improve the uniformity of fuel-air mixture reaching an enabled zone of the catalytic bed.

U.S. Pat. Nos. 4,845,952 and 4,966,001 disclose a multiple venturi tube device that employs a plurality of closely spaced parallel venturi tubes disposed in a pair of spaced-apart header plates. The venturi tubes are brazed to the header plates and the perimeters of the header plates are sealed to form a plenum into which pressurized gaseous fuel is supplied. The venturi tubes are arranged in a circular pattern that creates numerous large and irregularly shaped recirculation zones at their exit plane. These large and irregular recirculation zones result in poor flameholding resistance at the exit of the premixer. The recirculation zones downstream of the venturi exits created by the spaces between the venturis may allow a burnable mixture of fuel and air to stabilize in these regions.

BRIEF DESCRIPTION OF THE INVENTION

Exemplary embodiments of the invention include a gas fuel injector includes a first header plate; a second header plate spaced downstream from the upstream header plate; and a plurality of venturi tubes arranged in rows and sealably secured to the first and second header plates. Each of the venturi tubes includes an inlet section, a throat section and an exit. The exit is shaped into a pattern that reduces space between each of the venturi tubes at the exit of each of the plurality of venturi tubes.

Further exemplary embodiments of the invention include a combustor for a gas turbine engine including a preburner; a fuel injector downstream of the preburner; and wherein the fuel injector includes a plurality of venturi tubes arranged in rows. Each of the venturi tubes includes an inlet section, a throat section and an exit. The exit is shaped into a pattern that minimizes space between exiting flow areas each of the plurality of venturi tubes at the exit of each of the plurality of venturi tubes.

The above, and other objects, features and advantages of the present invention will become apparent from the following description read in conjunction with the accompanying drawings, in which like reference numerals designate the same elements.

BRIEF DESCRIPTION OF THE DRAWINGS

Referring now to the drawings wherein like elements are numbered alike in the several FIGURES.

DETAILED DESCRIPTION OF THE INVENTION

A typical gas turbine engine employs a plurality of parallel combustors disposed in a circle about an axis. A fuel-air mixture is burned in each combustor to produce a hot, energetic flow of gas. The gas from each combustor travels through a transition piece wherein the gas flow is changed from a generally circular field to a field approximating an arc of a circle. The outlets of all of the transition pieces are arranged to form a full circle leading to turbine blades of the machine. All of the above is conventional and does not require further description to enable full understanding by one skilled in the art. Accordingly, attention is focused in the remainder of the present description on a single combustor, it being understood that all combustors in a gas turbine engine are substantially identical to the one described. Only those additional portions of a gas turbine engine required for an understanding of the environment in which the combustor operates are shown and described.

Figure 1:
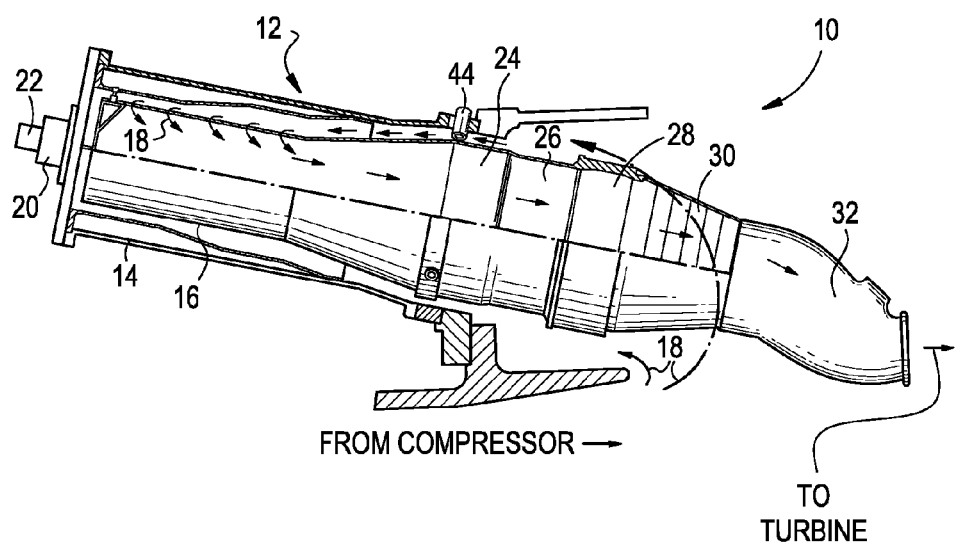
FIG. 1 is a side view, partly in cross section, of a portion of a gas turbine engine showing a combustor with a multiple-venturi tube gas fuel injector.

Referring to FIG. 1, there is shown, generally at 10, a gas turbine engine having a combustor assembly 12 according to an embodiment of the invention. Combustor assembly 12 may include both a combustor with a catalytic component and a combustor without a catalytic component. A preburner section 14 receives combustion and dilution air 18 through a preburner liner 16. During startup, a preburner fuel nozzle 20 receives a flow of a fuel on a fuel line 22 for combustion in preburner section 14. Under more fully loaded conditions of gas turbine engine 10, fuel may be cut off entirely from preburner fuel nozzle 20.

The air and products of combustion in preburner section 14 flow through a multiple-venturi tube gas fuel injector 24 in which additional fuel is added to the flow field before it passes into a fluid momentum mixing section 26. As will be further detailed, multiple-venturi tube gas fuel injector 24 includes a plurality of parallel venturi tubes to enhance vigorous mixing of air and added fuel. In the configuration of a combustor assembly 12 that includes a catalyst bed 28, the mixture entering fluid momentum mixing section 26 from the plurality of venturi tubes is further mixed together as it travels along fluid momentum mixing section 26 until it reaches a catalyst bed 28. As the fuel-air mixture passes through catalyst bed 28, a combustion reaction takes place, catalyzed by catalyst material in catalyst bed 28. The resulting hot, energetic gasses exiting catalyst bed 28 pass through a reaction zone 30 before being turned and shaped in a transition piece 32 for delivery to a turbine (not shown). It will be noted that in the configuration of a combustor assembly 12 that does not include a catalyst bed 28, the mixture entering fluid momentum mixing section 26 from the plurality of venturi tubes is further mixed together as it travels along fluid momentum mixing section 26 until it reaches a flame-stabilizing device (not shown) in place of catalyst bed 28. As the fuel-air mixture passes through the flame stabilizing device (not shown), a combustion reaction takes place and is sustained by the flame-stabilizing device. The resulting hot, energetic gasses exiting from the flame stabilizing device pass through a reaction zone 30 before being turned and shaped in a transition piece 32 for delivery to a turbine (not shown). Although exemplary embodiments disclosed herein are described with respect to a catalyst only combustor application since one aspect of the invention includes enhanced mixing and reduced flame-holding potential of the fuel air mixture prior to its entrance into the catalyst bed 28, however, the invention is not limited thereto and also has the potential to provide these benefits in a non-catalytic combustor where it is desired to achieve acceptable mixing of the fuel and air prior to their combustion at a location desirably distant from the venturi exit plane.

The length and shape of preburner section 14 depends on the type of fuel to be used for preburner heating. The embodiment shown is suitable for use with natural gas fuels in preburner fuel nozzle 20. This should not be taken to exclude the use of other gaseous fuels or liquid fuel in preburner section 14. If such other fuels are used in preburner section 14, one skilled in the art would recognize that suitable modifications in, for example, shape and dimensions, are required to accommodate them.

Figure 2:
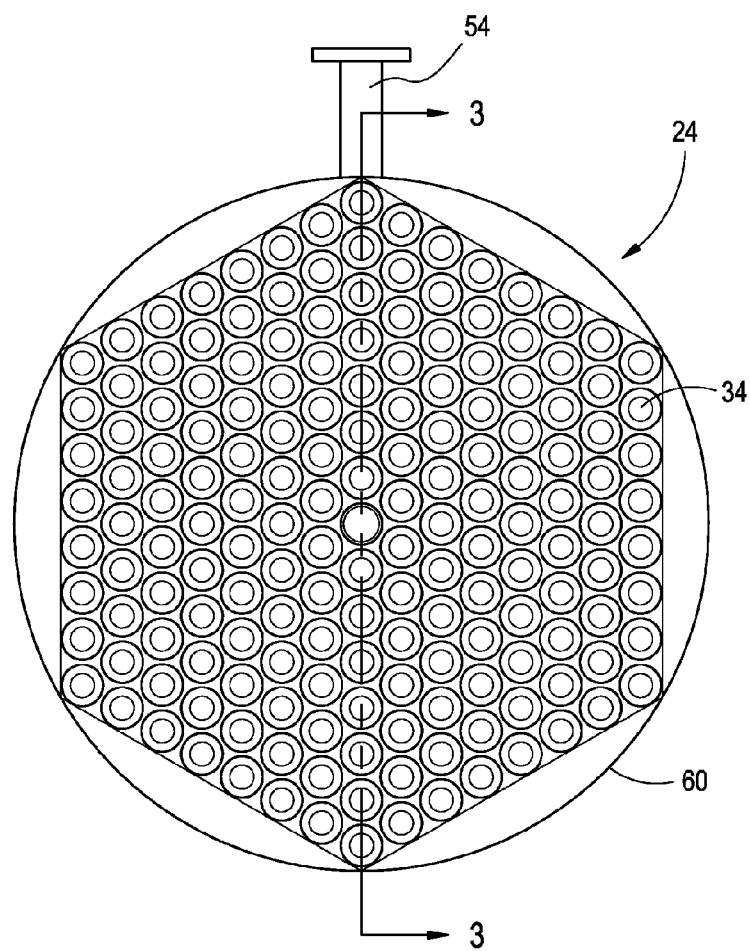
FIG. 2 is a view from the catalyst inlet looking upstream at a multiple-venturi tube gas fuel injector according to an embodiment of the invention.
Figure 3:
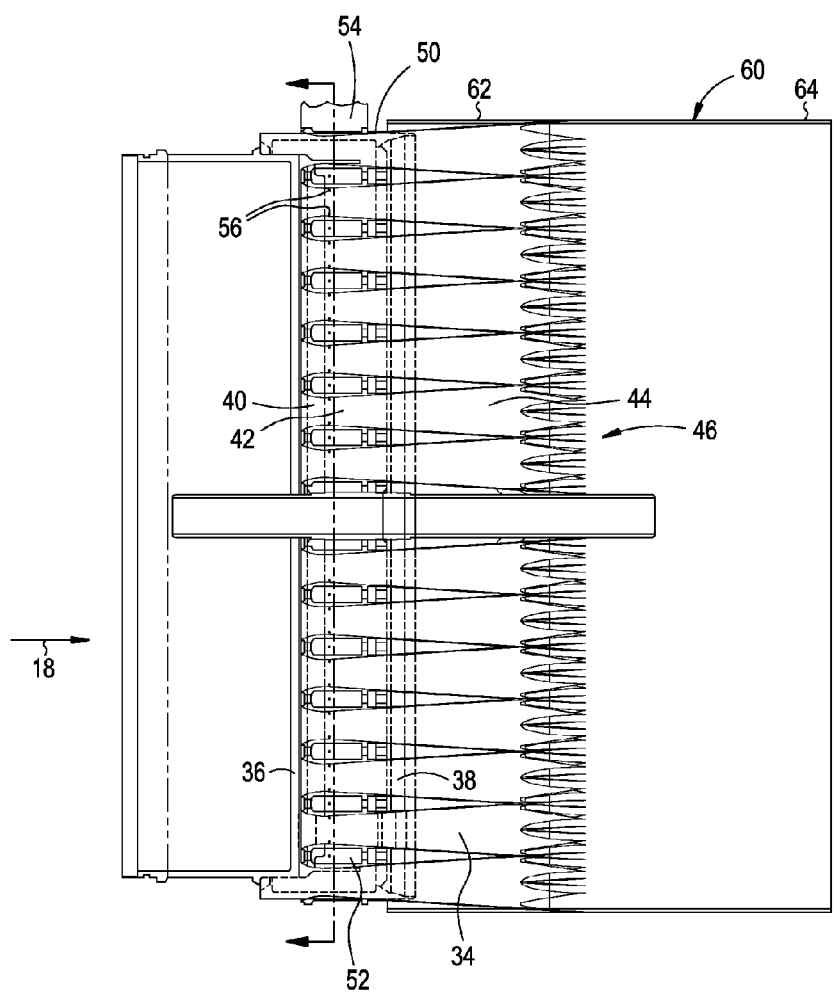
FIG. 3 is a cross-section of the injector of FIG. 2 taken along 3—3.

FIGS. 2 and 3 illustrate the multiple-venturi tube gas fuel injector 24, which includes a plurality of venturi tubes 34 sealably affixed in an upstream header plate 36. A downstream header plate 38 is spaced downstream from upstream header plate 36 and also sealably affixed to venturi tubes 34 forming a gas fuel plenum 52. The header plates 36 and 38 are sealably affixed to the venturi tubes by brazing or any other method of attachment. Each venturi tube 34 has an inlet section 40, a throat 42, a body 44, and an exit 46. An external manifold 50, which is sealed about the perimeters of upstream and downstream header plates 36 and 38, forms a sealed fuel gas plenum 52 between upstream and downstream header plates 36 and 38 and about the perimeters of all venturi tubes 34. Gaseous fuel, under pressure, is fed to external manifold 50 through a fuel gas supply line 54. In an exemplary embodiment, there are four gas supply lines 54 (only one is shown), which are evenly spaced around injector 24. Supplied fuel is distributed around the perimeter of gas fuel plenum 52 by external manifold 50. Fuel gas in plenum 52 enters venturi tubes 34 through hole 56, which may be located at inlet section 40 or throat 42. When holes 56 are located at inlet section 40, the fuel and air mixing within the venturi tube 34 is enhanced because greater fuel jet penetration and residence time for diffusion occurs before reaching the exit 46 of the venturi tubes 34.

The venturi tubes 34 are arranged in rows so as to create an arrangement that minimizes the space between the exits of the venturi tubes 34 available for creating a recirculation of the flow exiting the venturi tubes 34 through their exits 46. In particular, the exits are shaped into a pattern that allow the entire perimeters at the exit 46 of the venturi tubes 34 to be surrounded by the adjoining perimeters at the exit 46 of adjacent venturi tubes 34. In addition, the exit of the venturi tube 34 has a shape that matches the arrangement of the venturi tubes 34. In an exemplary embodiment, the venturi tubes 34 are arranged in a hexagonal outline and the exit 46 of the venturi tube has a hexagonal shape. In addition, the arrangement of the venturi tubes 34 has the capability to maximize the number of venturi tubes 34 that can be utilized in the injector 24 as desired.

Figure 4:
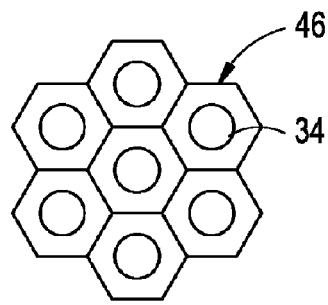
FIG. 4 is a view of an alternative embodiment of a plurality of venturi tubes corresponding to venturi exits thereof.

Referring to FIGS. 2, 3 and 4, each venturi tube 34 includes inlet section 40, which has a circular opening at an upstream end of the injector 24, and throat 42 that is located between the upstream and downstream header plates 36 and 38. From throat section 42, venturi tube 34 transitions through body 44 to an exit 46 of venturi tube 34. The venturi tube 34 expands through body 44 and transitions from a circular shape to a shape that reduces the space between each of the venturi tubes 34 at exit 46 of the venturi tube 34, which is shown as hexagonal in FIG. 4.

The hexagonal shape of the exit 46 can be formed in a number of ways. For instance, the venturi tube 34 can have a constant wall thickness in the body 44 downstream of the throat 42. Body 44 can then be formed such that it transitions from a circular to a hexagonal shape from the throat 42 to the exit 46, respectively. In addition, the venturi tube 34 can be made with thicker walls, and the sides of the exit are machined such that a hexagonal shape exists on the outside surface of the exit 46 and a circular shape remains on the inner surface.

Figure 5:
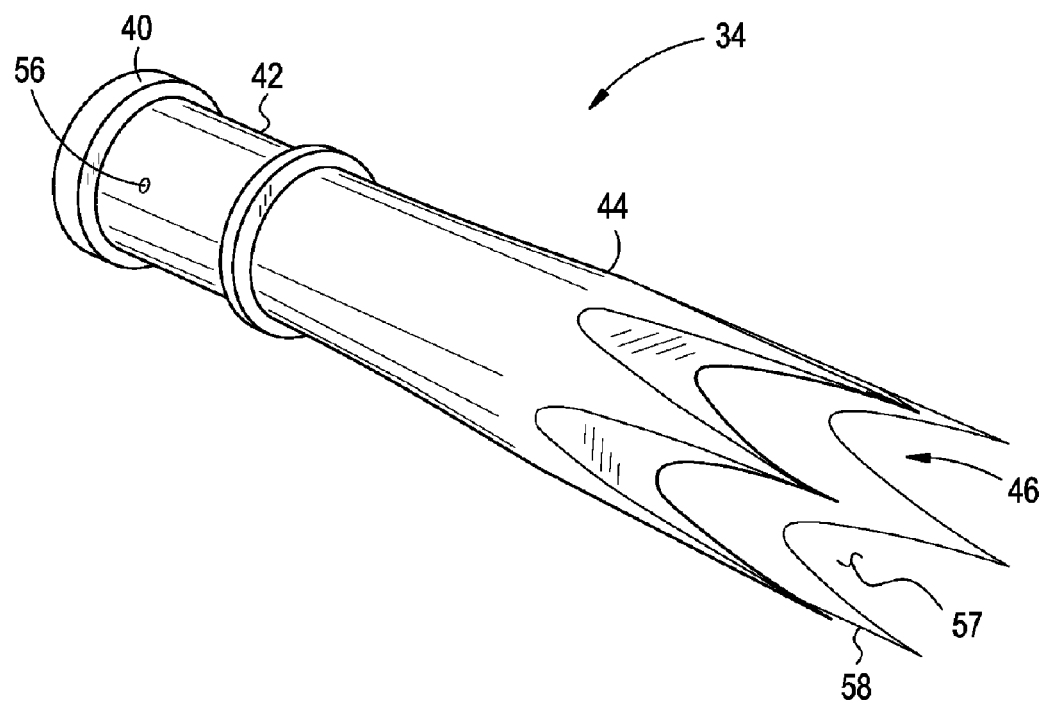
FIG. 5 is a perspective view of an embodiment of a single venturi tube where internal flow surface remains conical and outer surface is cut in a hexagonnal shape relative to a centerline of the venturi.

Referring to FIGS. 2, 3, and 5, in another exemplary embodiment, the venturi tubes 34 are arranged in a hexagonal pattern and the shape of the exit 46 is a jagged shape in which six sides 57 are removed so as to have six spikes 58. Thus, because the exit 46 of the venturi tube 34 has six spikes 58 that are the same, the exit 46 takes on a hexagonal shape. Each spike 58 fits next to a removed portion 57 of the venturi tube 34 that is next to it. When these venturi tubes are packed closely as in the exemplary embodiment of the hexagonal arrangement, 3 spikes 58 of adjacent venturis combine to effectively form one spike. This arrangement also minimizes the space between each of the exits 46 of the venturi tubes 34 and minimizes the recirculation of the air and fuel mixture as it exits the venturi tubes 34.

Figure 6:
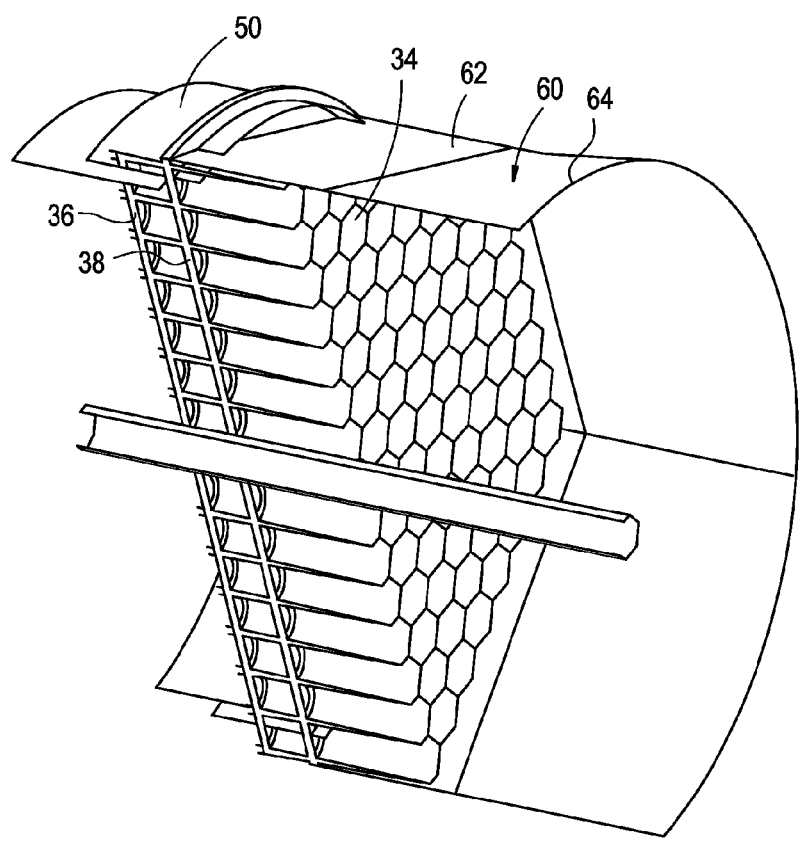
FIG. 6 is a perspective side view of the injector of FIG. 2 employing the venturi tube of FIG. 4.
Figure 7:
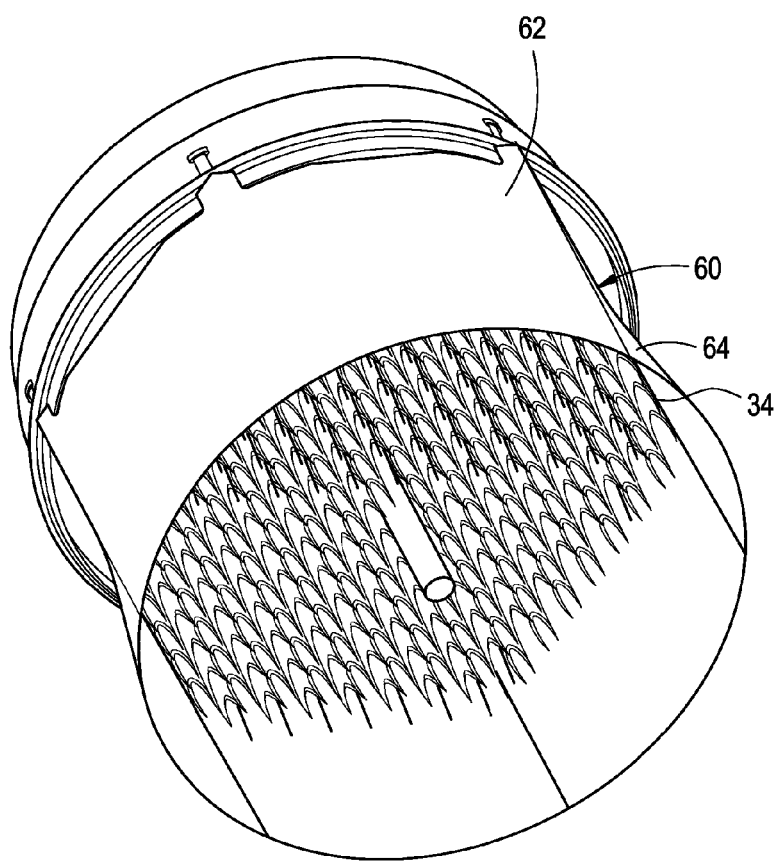
FIG. 7 is a perspective side view of the injector of FIG. 2 employing the venturi tube of FIG. 5.

Injector 24 also includes an exit diffuser 60, which has a forward end 62 having a hexagonal shape so as to have less space between the outside row of the venturi tubes 34 and the exit diffuser 60 (see FIGS. 6 & 7). As the exit diffuser 60 expands away from the exit 46 of the venturi tube 34, the exit diffuser 60 transitions back to a circular shape at an aft end 64 so that it can match with fluid momentum mixing section 26 and entrance to catalyst bed 28 (see FIGS. 1 and 3). Thus, the forward end of the exit diffuser 60 is hexagonal and an aft end of the exit diffuser 64 is circular.

In an exemplary embodiment, there are one hundred twenty-nine venturi tubes 34. However, other total venturi tube counts can be used in other substantially packed circular arrangements with other polygon exit geometries to achieve similar reduced recirculation zone and flameholding potential at the venturi exits 46. Air 18 flows through preburner liner 16 and enters venturi tubes 34. Fuel is injected through gas supply line 54 into the external fuel manifold 50 and is distributed evenly around the OD of the area between the upstream and downstream header plates 36 and 38. Because of the arrangement of the venturi tubes 34, each space between each of the venturi tubes is a consistent size and is also controlled due to the packed arrangement of the venturi tubes 34. The volume of the fuel plenum manifold 52 formed between the header plates 36 and 38 and the outside perimeter of the venturi tube 34 acts as a fuel plenum by design. Fuel enters venturi tubes 34 through holes 56 and mixes with air 18. The size of the plenum area is selected to provide a more consistent pressure supply of fuel to each fuel injection hole 56 in the entire injector 24.

Referring to FIGS. 1–7, in operation, an air stream, at times accompanied by products of combustion of preburner section 14, pass from left to right in the FIG. 1, entering preburner section 14 and exiting reaction zone 30. A gas passing through a venturi tube is accelerated to a maximum velocity at throat 42 and then is decelerated during its passage through exit diffuser 60. A gaseous fuel, injected through holes (or orifices) 56 into throat 42 at right angles to the high-speed air flow existing there, is subjected to high shear forces and turbulence, effective for producing complete mixing of the fuel gas and air as it exits exit diffuser 60.

The mixture exits exit diffuser 60 with substantial kinetic energy and turbulence. This enables mixing of the gas streams from adjacent venturi tubes 34 such that, after traveling to the end of fluid momentum mixing section 26 (FIG. 1), a substantially uniform velocity and fuel-air mixture is attained across the entire flow field as it enters catalyst bed 28. Gas flow having uniform velocity and fuel-air mixture, as is provided by the present invention, is necessary for efficient operation of catalyst bed 28.

Injection of the fuel gas at right angles to the gas flow in throat 42, places the injection point of the gas fuel at the highest-velocity point in the system upstream of catalyst bed 28. The high air velocity at throat 42 prevents flashback upstream toward preburner fuel nozzle 20, and also avoids flameholding in multiple-venturi tube gas fuel injector 24. It is thus possible to inject a fuel gas into the air stream even when the air stream is heated by operation of preburner fuel nozzle 20 in preburner section 14 during startup without concern for possible flashback. It is likely that the lower air velocity at inlet section 40 would not be high enough to provide a sufficient margin against flashback during all operating conditions.

Fuel gas supply line 54 may serve as part of a supporting structure for supporting multiple-venturi tube gas fuel injector 24. Three additional supports (not shown) may be provided for additional support of multiple-venturi tube gas fuel injector 24. These additional supports may be evenly spaced around injector 24. Although a single fuel gas supply line 54 is capable of providing a uniform flow of fuel gas to all venturi tubes 34 in multiple-venturi tube gas fuel injector 24, one or more of supports, besides providing support, may also be employed as additional means for feeding fuel gas to multiple-venturi tube gas fuel injector 24.

In addition, while the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims. Moreover, the use of the terms first, second, etc. do not denote any order or importance, but rather the terms first, second, etc. are used to distinguish one element from another.

What is claimed is:

1. A gas fuel injector comprising:
   a first header plate;
   a second header plate spaced downstream from said first header plate;
   a plurality of venturi tubes arranged in straight rows and sealably secured to said first header plate and said second header plate,
   wherein each of said venturi tubes includes an inlet section, a throat section and an exit, said exit is shaped into a pattern that reduces space between each of said venturi tubes at said exit of each of said plurality of venturi tubes.

2. The injector of claim 1, wherein said venturi tubes further includes a body section that transitions between a circular shape of said throat and a different shape of said exit.

3. The injector of claim 1, wherein said plurality of venturi tubes are arranged in a hexagonal pattern.

4. The injector of claim 1, wherein said exit is shaped so as to match an arrangement of said venturi tubes.

5. The injector of claim 1, wherein said exit is shaped as a hexagon.

6. The injector of claim 1, wherein said exit has a plurality of pointed ends formed from a conical interior and hexagonal perimeter.

7. The injector of claim 1, further comprising a manifold that is sealed about a perimeter of said first and second header plates.

8. The injector of claim 7, wherein said manifold, a perimeter of said first and second head plates, and a perimeter of each of said plurality of venturi tubes forms a plenum space and a fuel line is in fluid communication with said plenum space via an external manifold which acts to evenly distribute fluid around perimeter of said plenum.

9. The injector of claim 1, wherein each of said plurality of venturi tubes includes at least one hole for receiving fuel, said at least one hole is disposed at either said inlet section or said throat.

10. The injector of claim 1, further comprising an exit diffuser surrounding said plurality of venturi tubes.

11. The injector of claim 1, wherein said exit diffuser has a first end that is shaped to match the arrangement of said plurality of venturi tubes and a second end that is circular.

12. A combustor for a gas turbine engine comprising:
a preburner;
a fuel injector downstream of said preburner, and
wherein said fuel injector includes a plurality of venturi tubes arranged in straight rows, each of said venturi tubes includes an inlet section, a throat section and an exit, said exit is shaped into a pattern that minimizes space between eting flow area of each of said plurality of venturi tubes at said exit of each of said plurality of venturi tubes.

13. The combustor of claim 12, further comprising a catalyst bed downstream of said fuel injector passing through said catalyst bed and experiencing a combustion reaction while passing therethrough wherein energetic gases are emitted downstream of said catalyst bed.

14. The combustor of claim 12, wherein said injector further comprises:
a first header plate;
a second header plate spaced downstream from said first header plate,
wherein said plurality of parallel venturi tubes are sealably secured to said first header plate and said second header plate.

15. The combustor of claim 12, further comprising a manifold that is sealed about a perimeter of said first and second header plates.

16. The combustor of claim 15, wherein said manifold, a perimeter of said first and second head plates, and a perimeter of each of said plurality of venturi tubes forms a plenum space and a fuel line is in fluid communication with said plenum space via an external manifold which acts to evenly distribute fluid around perimeter of said plenum.

17. The combustor of claim 12, wherein said venturi tubes are arranged in a hexagonal pattern.

18. The combustor of claim 12, wherein said exit is shaped so as to match an arrangement of said venturi tubes.

19. The combustor of claim 12, wherein said exit is shaped as a hexagon.

20. The combustor of claim 12, wherein said exit has a plurality of pointed ends.

21. The combustor of claim 12, wherein each of said plurality of venturi tubes includes at least one hole for receiving fuel, said at least one hole is disposed at either said inlet section or said throat.

22. The combustor of claim 12, wherein said injector further comprises an exit diffuser surrounding said plurality of venturi tubes.

23. The combustor of claim 22, wherein said exit diffuser has a first end that is shaped to match the arrangement of said plurality of venturi tubes and a second end that is circular.

* * * * *

UNITED STATES PATENT AND TRADEMARK OFFICE
CERTIFICATE OF CORRECTION

PATENT NO. : 7,093,438 B2  Page 1 of 1
APPLICATION NO. : 10/905686
DATED : August 22, 2006
INVENTOR(S) : Constantin Dinu et al.

It is certified that error appears in the above-identified patent and that said Letters Patent is hereby corrected as shown below:

Title Page,
Item (54) Title, delete "VENTURE" and insert therefor --VENTURI--.

Column 1,
Line 1, after "MULTIPLE" delete "VENTURE" and insert therefor --VENTURI--.

Column 7,
Line 39, after "between" delete "eting" and insert therefor --exiting--.

Signed and Sealed this

Twenty-sixth Day of December, 2006

JON W. DUDAS
*Director of the United States Patent and Trademark Office*